US011904490B2

(12) United States Patent
Hawkins et al.

(10) Patent No.: US 11,904,490 B2
(45) Date of Patent: Feb. 20, 2024

(54) SYSTEMS AND METHODS FOR HIGH THROUGHPUT CUTTING OF SEALING ELEMENTS ON PACKAGES

(71) Applicant: Walmart Apollo, LLC, Bentonville, AR (US)

(72) Inventors: Bryan Hawkins, Bentonville, AR (US); Joseph David Blackner, Bella Vista, AR (US); John Marshall Jones, Fayetteville, AR (US); Santos Cerda, Jr., Centerton, AR (US); Geoffrey Michael Miller, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/990,871

(22) Filed: Nov. 21, 2022

(65) Prior Publication Data

US 2023/0081340 A1    Mar. 16, 2023

Related U.S. Application Data

(63) Continuation of application No. 16/527,735, filed on Jul. 31, 2019, now abandoned.
(Continued)

(51) Int. Cl.
*B26D 7/06* (2006.01)
*B65B 69/00* (2006.01)
*B65G 13/04* (2006.01)

(52) U.S. Cl.
CPC ........ *B26D 7/0625* (2013.01); *B65B 69/0033* (2013.01); *B65G 13/04* (2013.01)

(58) Field of Classification Search
CPC .... B26D 7/0625; B65B 69/0033; B65G 13/04
(Continued)

(56) References Cited

U.S. PATENT DOCUMENTS 4,044,897 A    8/1977 Maxted
4,604,083 A    8/1986 Barny
(Continued)

FOREIGN PATENT DOCUMENTS

CN    102079407 A    6/2011
CN    105000233 A    10/2015
(Continued)

OTHER PUBLICATIONS

International Search Report and Written Opinion for Application No. PCT/US2019/044367 dated Dec. 11, 2019, 9 pages.
(Continued)

*Primary Examiner* — Omar Flores Sanchez
(74) *Attorney, Agent, or Firm* — Fitch, Even, Tabin & Flannery LLP

(57) ABSTRACT

Systems and methods described herein are optimized for cutting sealing elements on packages using optical radiation. Packages can pass through a cutting device that applies the optical radiation to damage, vaporize, or cut the sealing element (e.g., tape) on the package. The systems and methods control several aspects of the cutting process to adjust throughput, improve efficiency, and reduce line stoppages. Systems can include an in-feed conveyor that orients packages and rejects packages that are out of specification, which can lead to issues such as jamming or damage to the equipment. Systems can include a variable-speed cut conveyor controlled by a computing system to dynamically adjust the speed of packages based upon historical cut quality, environmental measurement data, and height data related to a vertical dimension of the package.

19 Claims, 12 Drawing Sheets

Related U.S. Application Data

(60) Provisional application No. 62/717,179, filed on Aug. 10, 2018.

(58) Field of Classification Search
USPC .............................................. 83/13
See application file for complete search history.

(56) References Cited

U.S. PATENT DOCUMENTS

| | | |
|---|---|---|
| 5,038,911 A | 8/1991 | Doane |
| 5,167,315 A | 12/1992 | Doane |
| 5,854,460 A | 12/1998 | Graf |
| 6,284,999 B1 | 9/2001 | Virtanen |
| 7,055,672 B2 | 6/2006 | Holmgren |
| 7,720,567 B2 | 5/2010 | Doke |
| 8,161,854 B2 | 4/2012 | Fourney |
| 9,457,474 B1 | 10/2016 | Lisso |
| 9,682,826 B2 | 6/2017 | Pierson |
| 9,926,094 B2 | 3/2018 | Dugat |
| 11,009,472 B2 | 5/2021 | Von Keudell |
| 11,331,758 B2 | 5/2022 | Hawkins |
| 2002/0068668 A1 | 6/2002 | Chow |
| 2007/0125211 A1 | 6/2007 | Hilgendorf |
| 2009/0113853 A1 | 5/2009 | Porter |
| 2014/0083268 A1* | 3/2014 | Rother ............... B26D 7/32 83/52 |
| 2015/0259155 A1 | 9/2015 | Schroader |
| 2016/0016684 A1 | 1/2016 | Dugat |
| 2018/0042176 A1 | 2/2018 | Obropta |
| 2018/0079618 A1 | 3/2018 | Miyashita |
| 2019/0376911 A1* | 12/2019 | Von Keudell ........... A23L 7/126 |
| 2020/0047364 A1 | 2/2020 | Hawkins |
| 2020/0047365 A1 | 2/2020 | Hawkins |
| 2020/0375203 A1* | 12/2020 | Pfanstiel ................ B26F 3/004 |

FOREIGN PATENT DOCUMENTS

| | | |
|---|---|---|
| EP | 0864501 A2 | 9/1998 |
| WO | 2007112740 A1 | 10/2007 |
| WO | 2014121646 A1 | 8/2014 |
| WO | 2020033201 | 2/2020 |
| WO | 2020033204 | 2/2020 |

OTHER PUBLICATIONS

International Search Report and Written Opinion for Application No. PCT/US2019/044387, dated Dec. 7, 2019, 12 pages.

USPTO; U.S. Appl. No. 16/527,735; Non-Final Rejection dated May 17, 2022; (7 pages).

USPTO; U.S. Appl. No. 16/527,735; Notice of Allowance and Fees Due (PTOL-85) dated Sep. 6, 2022; (pp. 1-5).

USPTO; U.S. Appl. No. 16/527,766; Non-Final Rejection dated Aug. 23, 2021; (20 pages).

USPTO; U.S. Appl. No. 16/527,766; Notice of Allowance and Fees Due (PTOL-85) dated Jan. 20, 2022; (pp. 1-17).

* cited by examiner

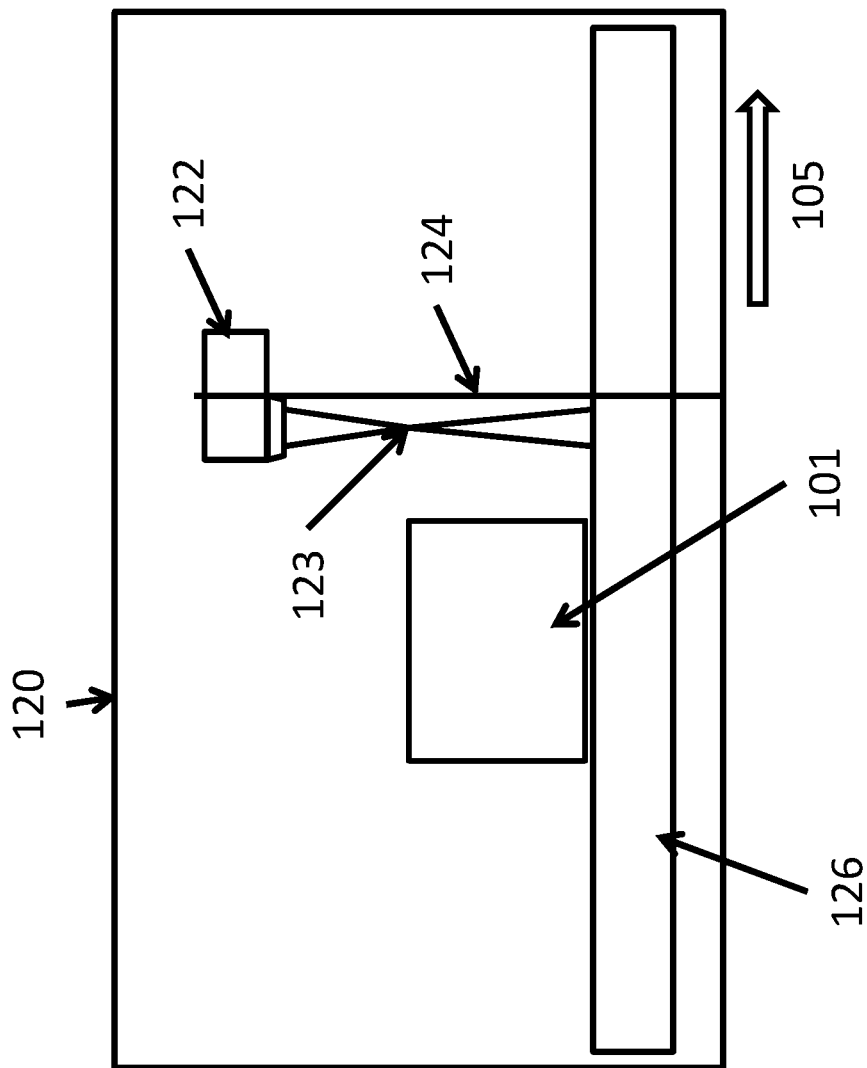
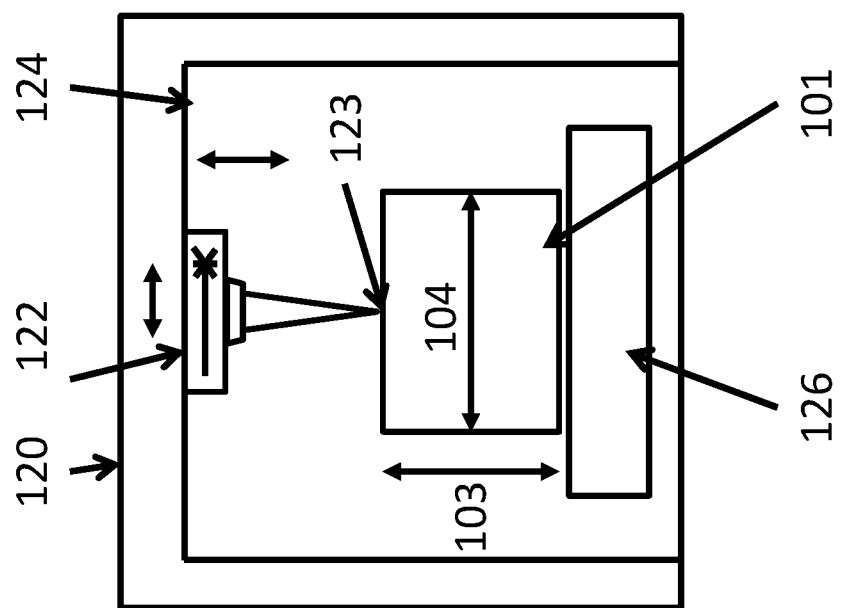
FIG. 2B
FIG. 2A

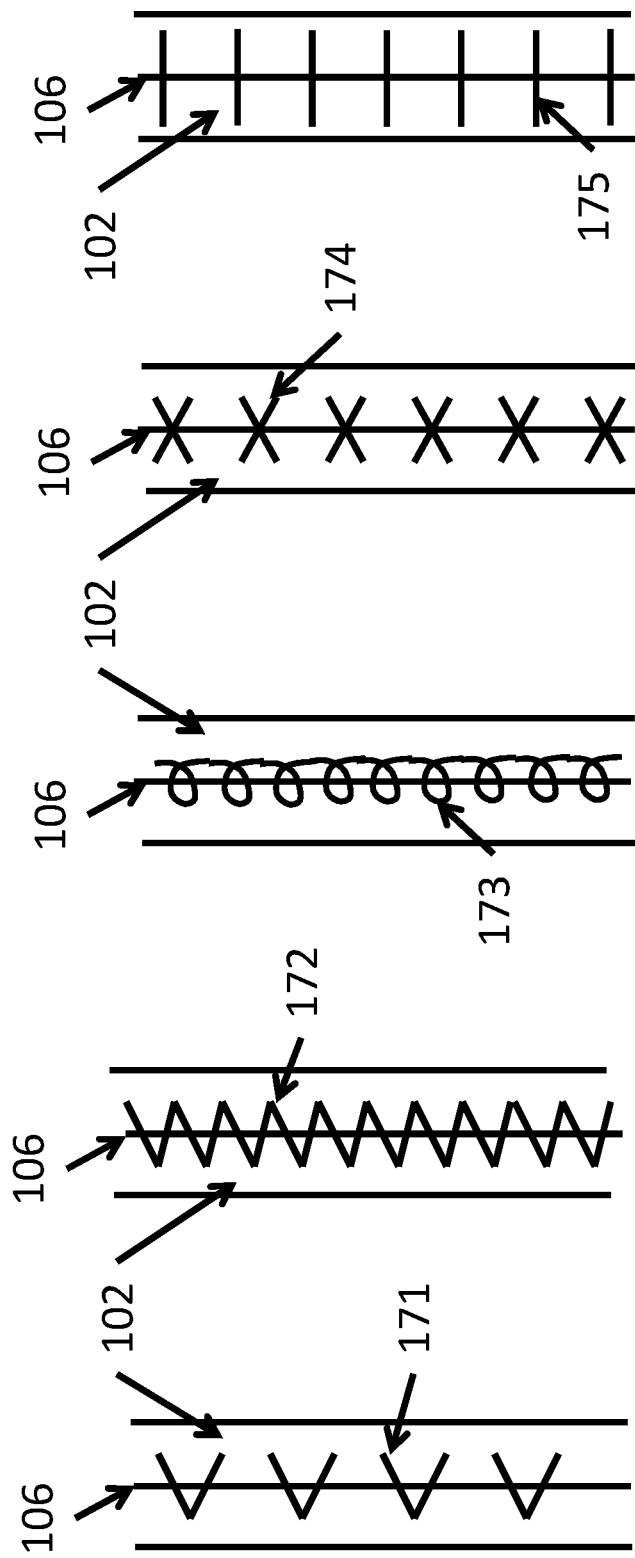

SYSTEMS AND METHODS FOR HIGH THROUGHPUT CUTTING OF SEALING ELEMENTS ON PACKAGES

RELATED APPLICATIONS

This application is a continuation application of U.S. application Ser. No. 16/527,735, filed Jul. 31, 2019, which claims the benefit of, and priority to, U.S. Provisional Application No. 62/717,179, filed Aug. 10, 2018, the entire contents of the above applications being incorporated herein by reference.

BACKGROUND

Warehouse facilities may receive a high volume of sealed packages that must be opened so that the package contents can be examined, removed, and/or transferred. Manual opening of each package is burdensome as it requires each facility worker to carry a cutting tool. Opening each package manually is time-consuming, inefficient, and presents an injury risk.

BRIEF DESCRIPTION OF DRAWINGS

Illustrative embodiments are shown by way of example in the accompanying drawings and should not be considered as a limitation of the present disclosure.

FIGS. 2A and 2B illustrate an end view and a side view, respectively, of a cutting device for use with cutting systems in accordance with various embodiments of the present disclosure.

FIGS. 7A-7E illustrate different cut patterns that are applied using systems and methods described herein.

DETAILED DESCRIPTION

Described in detail herein are systems and methods for cutting sealing elements on packages using optical radiation. Packages can pass through a cutting device that applies the optical radiation to cut, damage, ablate, remove, pierce or burn the sealing element (e.g., tape) on the package. The systems and methods control several aspects of the cutting process to adjust throughput, improve efficiency, reduce or limit wear on the cutting device, and reduce line stoppages. Systems can include an in-feed conveyor that orients packages and rejects packages that are out of specification, which can lead to issues such as jamming or damage to the equipment (e.g., the optical radiation source of the cutting device).

The cutting device adjusts the position of an optical radiation source to align with the sealing element of each package and/or adjusts the intensity and/or cutting pattern or patterns of the optical radiation source to adjust cutting parameters. The time to adjust the position can set a rate limit on how fast packages can be processed by the device. By aligning the packages in a consistent way (whether to a side or in the middle), the source translates over a small distance between packages thus leading to higher throughput.

Systems and methods described herein can include feedback from multiple sources to dynamically determine whether to speed up or slow down the cutting process, whether to adjust the intensity of the optical radiation emitted by the optical radiation source, and/or whether to adjust the cutting pattern of the optical radiation source. Cut quality, the sizes, shapes, or orientations of incoming packages, whether there is a string of similar packages, and environmental measurement data can be processed by a computing system that subsequently controls an in-feed conveyor system or a cut conveyor to speed up or slow down package processing and/or adjust the intensity and/or cutting patterns of the optical radiation source.

Systems and methods described herein can utilize alternative cut patterns that reduce the total wear on the optical radiation source and other replaceable components such as air filters. In addition, alternative cut patterns that cut only a portion of the sealing element can allow for faster processing as the time to cut each package is reduced.

Figure 1:
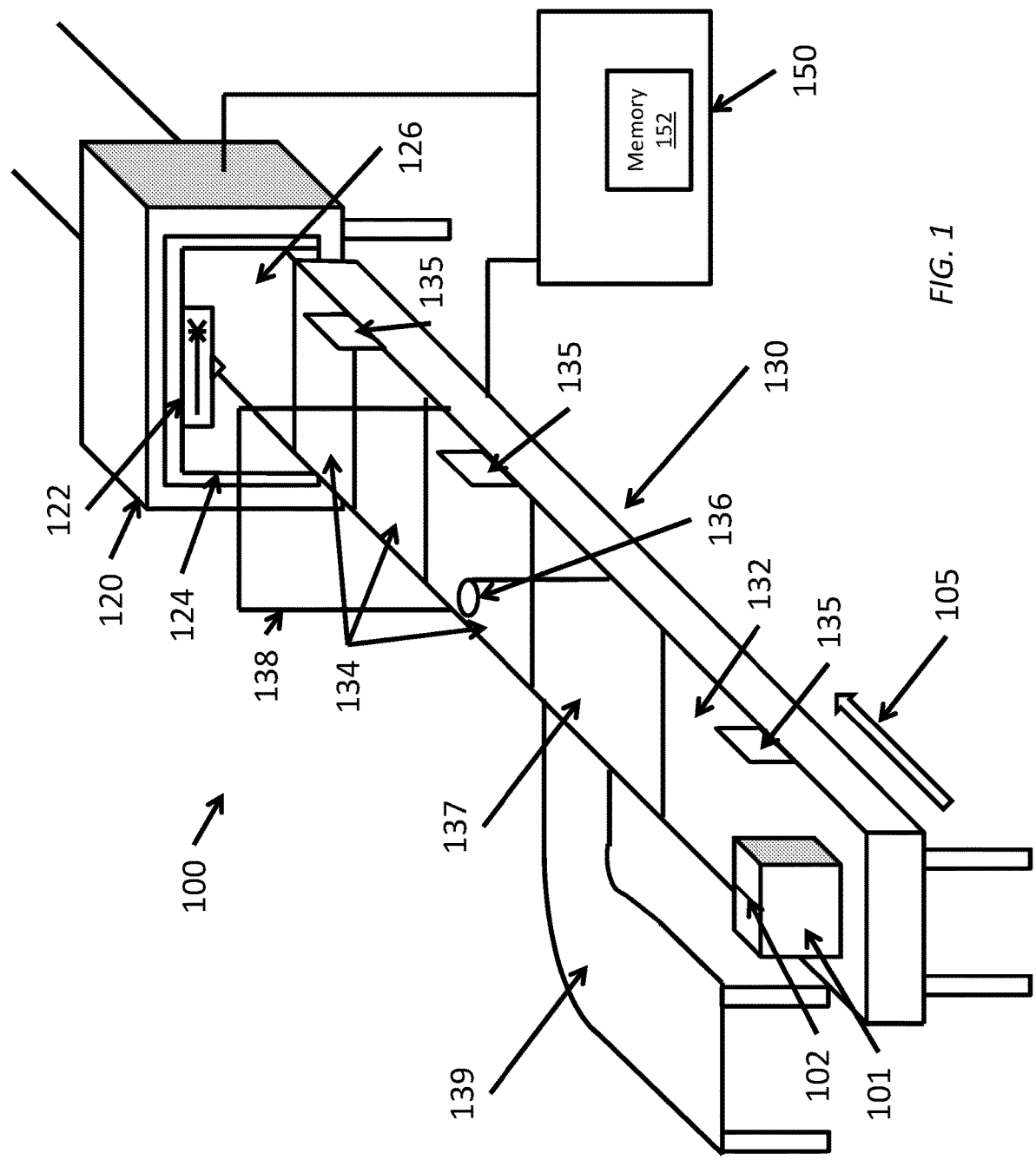
FIG. 1 illustrates a cutting system in accordance with various embodiments of the present disclosure.

FIG. 1 illustrates a cutting system 100 in accordance with various embodiments described herein. The cutting system 100 includes a cutting device 120, an in-feed conveyor system 130, and a computing system 150. The cutting device 120 includes an optical radiation source 122, a translation system 124, and a cut conveyor 126. The in-feed conveyor system includes a skew conveyor 132, one or more conveyor belts 134, one or more photodetectors 135, a height dimensioner 136, a diverter 137, and an entrance gate 138. The in-feed conveyor system 130 conveys a package 101 to the cutting device 120. The cut conveyor 126 of the cutting device 120 conveys the package past the optical radiation source 122. The optical radiation source 122 applies radiation to a sealing element 102 of the package 101 to cut, damage, ablate, remove, or pierce the sealing element 102. By irradiating the sealing element 102, the sealing element 102 is weakened so that a user downstream of the cutting system 100 can easily open the package 101 by hand without needing to use a tool such as a box-cutter. The in-feed conveyor system 130 organizes and conveys packages to the cutting device 120 to allow fast, continuous processing of packages 101 without slowdowns or stoppages created by disorganized or improper entry of packages into the cutting device 120. In some embodiments, the cutting system 100 can process a number of packages per hour, for example, in a range of about 400 packages per hour to about 2000 packages per hour.

The optical radiation source 122 focuses optical radiation at a focal point 123 as depicted in FIGS. 2A and 2B. The optical radiation source 122 can include a laser in some embodiments. The optical radiation source 122 can include lenses, mirrors, gratings, optical filters, optical fibers, waveguides, and/or other optical or focusing elements as appropriate to manipulate the optical beam and apply it to the sealing element 102 of the package 101. The translation system 124 adjusts a location of the focal point in three-dimensional space. In some embodiments, the translation system 124 is coupled to the entire optical radiation source 122 or at least a portion of the optical radiation source 122. That is, the entire optical radiation source 122 can be mounted to the translation system 124 in some embodiments. In other embodiments, only a portion (e.g., a lens or an end of an optical fiber) of the optical radiation source 122 can be mounted to the translation system 124. The translation system 124 can include translation elements that move independently in three orthogonal directions (e.g., X, Y, and Z directions). In some embodiments, the translation system 124 can include an X-Y plotter attached to a gantry that spans over the cut conveyor 126. Different packages 101 can have different vertical dimensions 103 or horizontal dimensions 104 that can cause the sealing element 102 of each package 101 to be located at a different position in three-dimensional space. The translation system 124 can raise or lower the location of the focal point vertically to accommodate packages of different heights. The translation system 124 can adjust the focal point across a width of the cut conveyor to position the focal point at the sealing element 102 of the package 101. In some embodiments, the translation system 124 may only position the focal point of the optical radiation in two-dimensions (e.g., vertically and horizontally across the width of the cut conveyor).

The skew conveyor 132 of the in-feed conveyor system 130 can adjust the position of the package 101 laterally with respect to a direction of travel 105 of the packages 101. In conventional systems, packages enter the cutting device 120 at random lateral positions thereby necessitating adjustment of the location of the focal point over large distances to place the focal point at the sealing element of each of the packages. Movement of the focal point over large distances requires allotment of extra time between packages to allow the translation system time to move the focal point and introduces excess wear on the translation system components. In contrast, the skew conveyor 132 can adjust the lateral position of each package 101 to align all of the packages 101 at a same position on the conveyor to reduce the distance that the focal point travels between adjacent packages. In some embodiments, the skew conveyor 132 can include one or more skewing elements 141. In some embodiments, skewing elements 141 of the skew conveyor 132 can dispose the package 101 along an outside edge of the skew conveyor 132. For example, the skewing elements 141 can dispose packages 101 along the left edge or right edge of the skew conveyor 132. In some embodiments, the skewing elements 141 can center the package with respect to the skew conveyor 132.

Figure 3A:
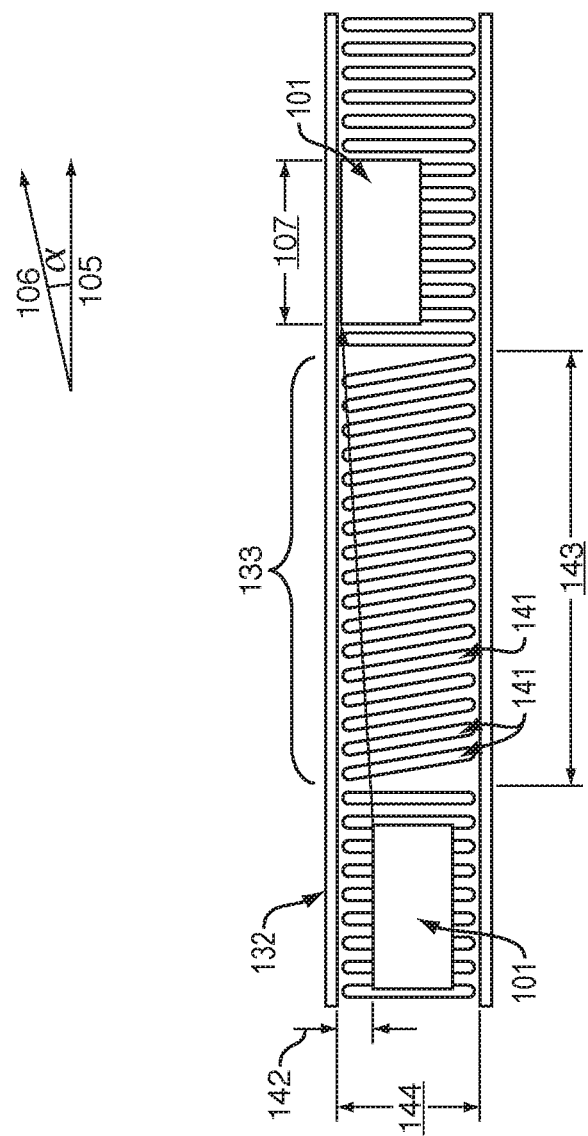
FIG. 3A illustrates a portion of a conveying system of the cutting system including a skew conveyor with skewing elements in the form of skewed rollers in accordance with various embodiments described herein.

As shown in FIG. 3A, the skewing elements 141 can include a plurality of skewed rollers in some embodiments. The skewed rollers can be powered in some embodiments. In some embodiments, the skewing rollers are skewed or tilted with respect to the direction of travel 105. The section 133 of skewed rollers can have a length 143. The skewed rollers can be skewed at a skew angle α with respect to the direction of travel 105. In some embodiments, the skew angle α can be selected based on the impact on the motor driving the skewing elements 141. In some embodiments, the skew angle α is in a range between about 6° and about 10° inclusive. The skew conveyor 132 can include more than one section 133 of skewed rollers in some embodiments. In some embodiments, the skew conveyor 132 can include a belted section.

The length 143 of the section 133 that includes the skewing elements 141 can be selected based upon a distance 142 between the package 101 and an edge of the skew conveyor 132. In other words, the distance 142 can be defined as the displacement through which the package 101 is to be moved laterally by the skew conveyor 132. The greater the distance 142, the longer the section 133 of the skew conveyor 132 needs to be to effectively transport the packages laterally to the desired position.

A width 144 of the skew conveyor 132 can be selected based upon a measured or anticipated width and/or length 107 of the packages 101 to be positioned using the skew conveyor 132. To avoid jamming the skew conveyor 132 by a package 101, the width 144 of the skew conveyor 132 can be chosen to be greater than the width and/or length 107 of the packages 101. Similarly, the skew angle α can be selected to prevent or reduce jamming of packages. Larger skew angles can only accommodate smaller maximum lengths 107 of the packages 101 that can be placed on the skew conveyor 132 to avoid jamming. As a result, the width 144 of the conveyor and skew angle α can be specified based on the maximum width and/or length 107 of the packages to be conveyed.

Figure 3B:
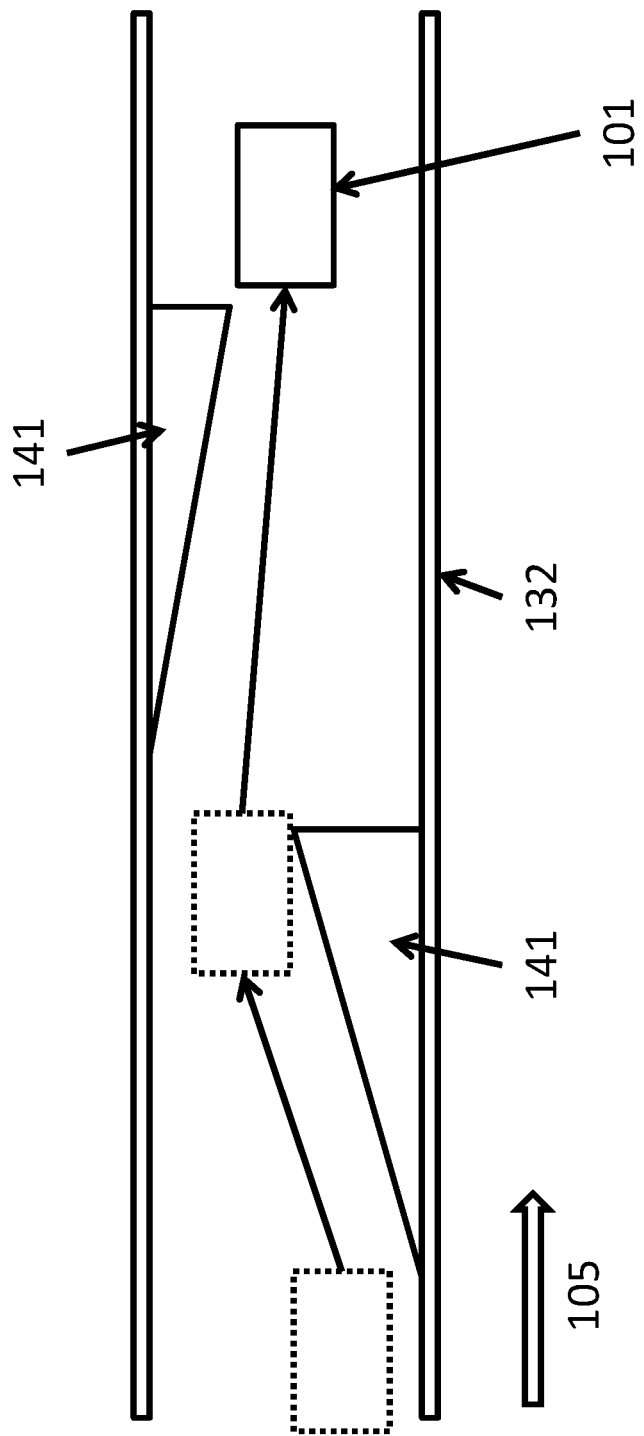
FIG. 3B illustrates a portion of a conveying system of the cutting system including a skew conveyor with skewing elements in the form of protrusions in accordance with various embodiments described herein.

FIG. 3B illustrates the skew conveyor with skewing elements 141 in the form of angled protrusions in accordance with various embodiments described herein. In some embodiments, the skewing elements 141 can include one or more angled protrusions that urge the package in the lateral direction as the package passes. As shown in FIG. 3B, the skewing elements 141 can be used to urge the package in a first lateral direction (e.g., to the left) and then in a second lateral direction (e.g., to the right). Such a configuration can be used, for example, to center the package 101 with respect to the skew conveyor 132. In other embodiments, the skewing elements can include a single angled protrusion to urge the packages only in a first lateral direction.

In some embodiments, the skewing elements 141 can arrange packages 101 into a single-file line. In some environments, packages may be loaded onto the in-feed conveyor system 130 in a side-by-side orientation. This orientation is disadvantageous at the cutting device 120 because the single optical radiation source can generally only be aligned with a single package and not two packages passing through the cutting device 120. In such an event, only a single package may be cut while the other package remains uncut. To avoid this problem, the skew conveyor 132 can form packages into a single-file line. For example, angled protrusions can be used to form "gates" that stop packages from passing through in a side-by-side configuration.

In some embodiments, the skewing elements 141 in the form of angled protrusions can physically stop and push packages into a single file line. For example, as two packages come to the angled protrusion in a side-by-side configuration, the package 101 to the exterior of the skew conveyor 132 can contact the angle protrusion and its motion on the conveyor will slow down and even stop. The package 101 to the interior (center) of the skew conveyor 132 continues to move until it has passed beyond the package 101 to the exterior at which point the package to the exterior can begin to move again.

Figure 4:
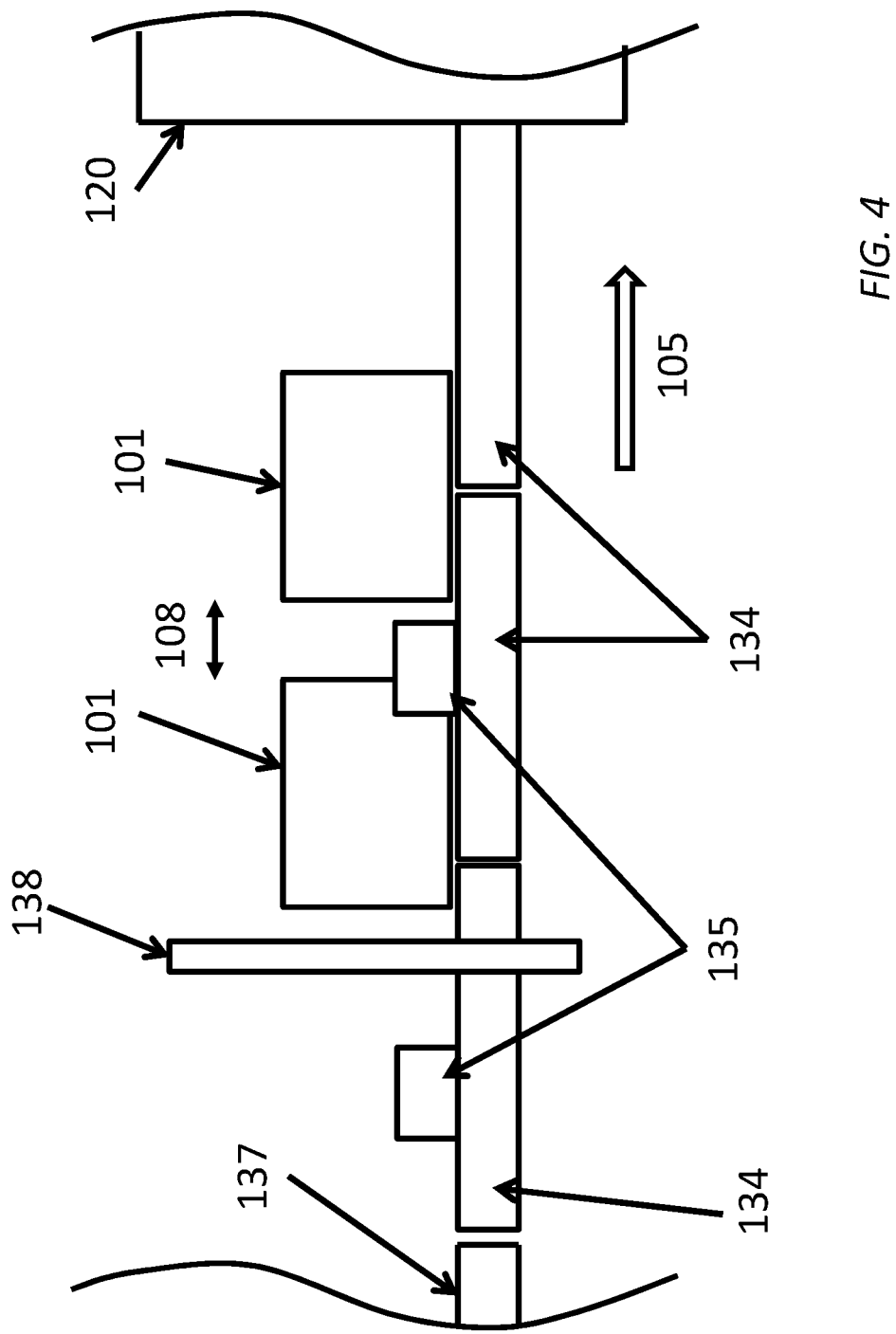
FIG. 4 illustrates a side view of a portion of the in-feed conveyor system 130 in accordance with various embodiments of the present disclosure.

FIG. 4 illustrates a side view of a portion of the in-feed conveyor system 130 in accordance with various embodiments of the present disclosure. The one or more conveyor belts 134 can include continuous belts or rollers in various embodiments. In some embodiments, the conveyor belts 134 are disposed between the skew conveyor 132 and the cutting device 120. In some embodiments, the conveyor belts 134 are disposed between the diverter 137 and the cutting device 120. The conveyor belts 134 can receive packages 101 from the skew conveyor 132 or the diverter 137 and convey packages in the direction of travel 105 or counter to the direction of travel 105 of the in-feed conveyor system 130.

Because the focal point 123 of the optical radiation can be adjusted for each package passing through the cutting device 120, it can be desirable to have a gap 108 between adjacent packages to allow time for the translation system 124 to adjust the position of the focal point 123 for each package 101. As packages 101 arrive at the conveyor belts 134, the gap 108 between adjacent packages 101 may be insufficient and the translation system 124 can fail to adjust the position of the focal point 123 in time. This can result in failure to cut the sealing element 102 of a package or incomplete cutting of the sealing element 102. Another result can be a collision between a package 101 and the optical radiation source 122 or translation system 124 if the translation system 124 is not able to move out of the way fast enough. In some embodiments, the gap 108 between packages can be proportional to the differential in vertical dimension 103 between the packages. For example, the operating speed in some embodiments is such that positioning of the focal point 123 by the translation system 124 determines that the gap 108 between packages is at least 2 inches (5.08 cm) if there is no differential in vertical dimension 103 between packages 101. In another embodiment, a differential in vertical dimension 103 between packages of 12 inches (30.5 cm) means that the translation system 124 needs more time between packages to move the focal point 123. In such an embodiment, the gap 108 between packages can be 8 inches (20.3 cm).

The computing system 150 can receive the detected data related to a position of a first package and a second package. In some embodiments, the computing system 150 receives data related to a position or horizontal dimension 104 of the package 101 from the one or more photodetectors 135. In some embodiments, the computing system 150 can use the one or more photodetectors 135 to monitor the gap 108 between packages 101. For example, the photodetector 135 can detect data such as the time between a first package leaving view of the photodetector 135 and a subsequent package 101 arriving at the photodetector 135. The computing system 150 can determine a gap between the first package and the second package based upon the data related to the position of the second package and the data related to the position of the first package. For example, the computing system 150 can combine this measured time and a predetermined speed of the conveyor belts 134 to determine the gap 108.

In some embodiments, the computing system 150 can select the gap 108 to maintain between subsequent packages as a function of package dimension or location of the sealing element 102 on the package 101. For example, if a number of similar packages approach the cutting device 120, the translation system 124 may not need to make a large adjustment (or any adjustment) to the position of the focal point 123 between cutting subsequent packages. In some embodiments, the computing system 150 can reduce or select the gap 108 based upon a detected property of the package such as package length, width, or height or based upon a detected position of the sealing element 102.

The computing system 150 can determine whether the gap 108 is below a threshold value. Upon determining that the gap 108 is below the threshold value, the computing system 150 can convey the first package or the second package using the conveyor belts 134 such that the gap 108 is increased. For example, the computer 150 can control one of the conveyor belts 134 to convey the first package in the direction of travel 105 or to convey the subsequent package counter to the direction of travel 105. The computer system 150 can control the conveyor belts 134 to convey the first package in the direction of travel 105 while holding the subsequent package still (e.g., stopping the conveyor upon which the subsequent package rests).

In some embodiments, the computing system 150 can receive data related to the position or horizontal dimension 104 of the package 101 from the one or more photodetectors 135. For example, the position of the package 101 can include a distance from the outside edge of the conveyor belts 134. The computing system 150 can then align the focal point of the optical radiation source 122 to the sealing element 102 of the package 101 based on the data related to the position or horizontal dimension 104 using the translation system 124.

Returning to FIG. 1, the height dimensioner 136 can be disposed adjacent to the diverter 137 or the skew conveyor 132 in various embodiments. The height dimensioner 136 can measure the vertical dimension 103 of the package 101 as the package passes by and produces height data related to the vertical measurement 103. In some embodiments, the height dimensioner 136 includes an imaging device and/or an electronic photoeye and/or a laser rangefinder. The height dimensioner 136 can determine the vertical dimension 103 of the package 101 by looking down at the top of the package 101 from a predetermined fixed position. The height dimensioner 136 then measures the distance from itself to the top of the case. The vertical dimension 103 is the difference between the predetermined fixed position and the measured distance to the top of the case. In some embodiments, the height dimensioner 136 is in communication with the computing system 150. Height data related to the vertical dimension 103 of the package 101 can be transmitted from the height dimensioner 136 to the computing system 150. In some embodiments, the computing system 150 can adjust the focal point 123 of the optical radiation in anticipation of the arrival of a package 101 using the height data obtained from the height dimensioner 136.

In some embodiments, the computing system 150 can compare the height data related to the vertical dimension 103 of the package 101 received from the height dimensioner 136 to a threshold value. If the vertical dimension 103 exceeds the threshold value, the package may be too large to safely pass through the cutting device 120. Upon making a determination that the vertical dimension 103 of the package 101 exceeds the threshold value, the computing system 150 can activate the diverter 137 to divert the package, for example, to an accumulation conveyor 139. The accumulation conveyor 139 can receive the diverted package and hold the diverted package until a user can manually assess the package 101. If the package 101 is too large to safely pass through the cutting device 120, the user can transfer the package to a manual opening area. In some embodiments, the user may reorient the package 101 and place it back on the in-feed conveyor system 130 in a different orientation. In some embodiments, the accumulation conveyor 139 can include rollers or belts. The rollers or belts can be powered or passive (i.e., gravity-operated).

The diverter 137 can convey the package at 90 degrees with respect to the direction of travel 105 of the package 101 in some embodiments. The diverter 137 can comprise at least two sets of rollers in some embodiments. For example, a first set of rollers can convey packages in the direction of travel 105 and a second set of rollers can convey packages 101 at an angle (e.g., 90 degrees) with respect to the direction of travel 105. In some embodiments, the first and second sets of rollers can be interleaved and the second set of rollers can be disposed below the first set of rollers. When the diverter 137 is controlled to divert a package 101, the second set of rollers can rise through the first set of rollers and assume the role of supporting the package 101 and conveying the package to the accumulation conveyor 139.

In some embodiments, the in-feed conveyor system 130 can include the entrance gate 138. The entrance gate 138 can prevent passage of the package 101 when the vertical dimension 103 of the package 101 exceeds the threshold value. In effect, the entrance gate 138 can act as a final impediment to oversized packages. That is, if an oversized package 101 is not properly diverted at the diverter 137, the entrance gate 138 can physically block the package 101 from entering the cutting device 120. In general, the inconvenience of having to clear an oversized package from the entrance gate 138 is more desirable than having to perform costly repairs to the cutting device 120 or components thereof because of a collision with an oversized package. In some embodiments, the entrance gate 138 can be disposed at one of the conveyor belts 134. Although the entrance gate 138 is shown in FIG. 1 as restricting packages 101 in both the horizontal dimension 104 and the vertical dimension 103, the entrance gate 138 can operate to restrict only one dimension in some embodiments.

Figure 5:
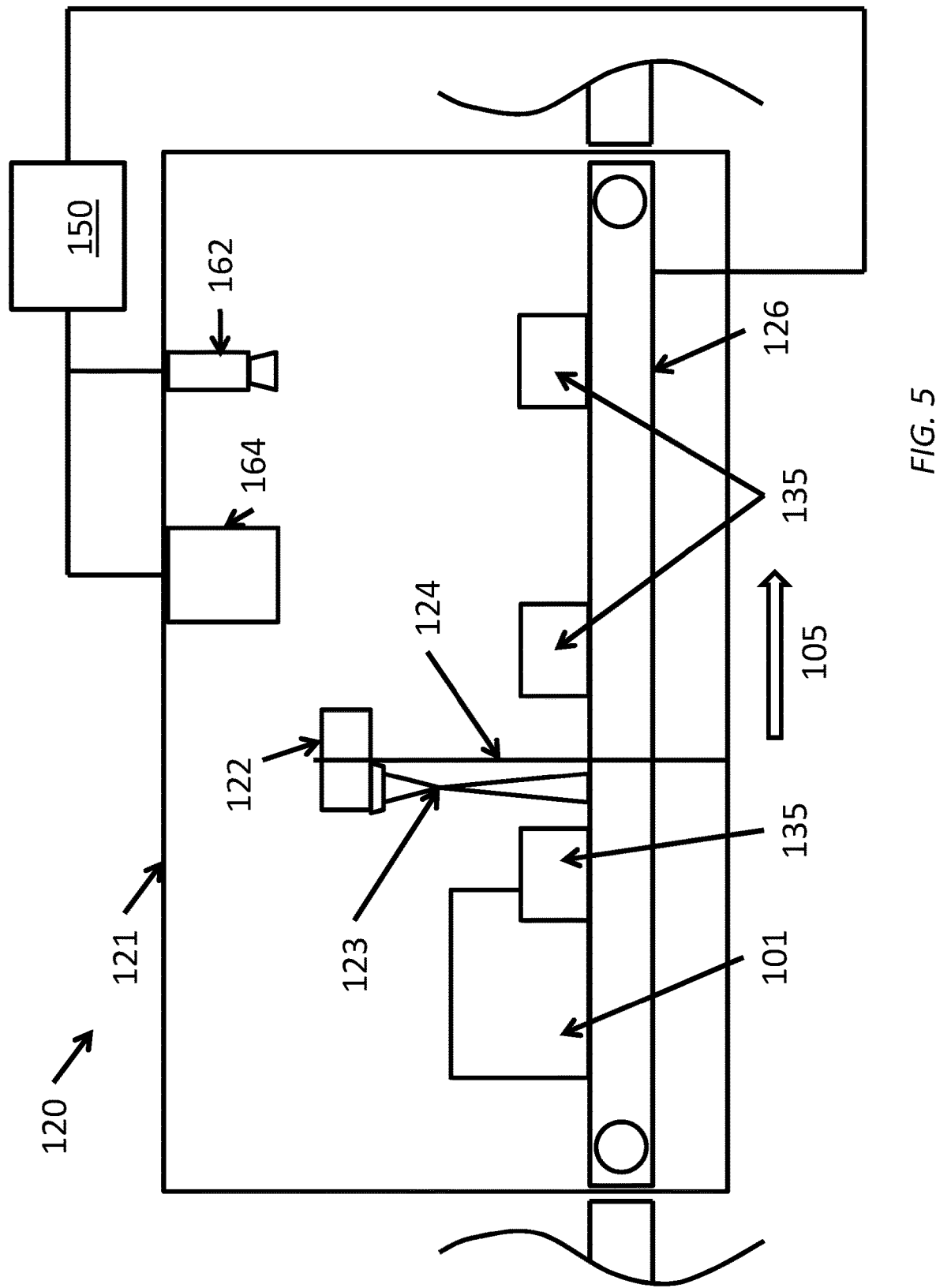
FIG. 5 illustrates a side view of the cutting device in accordance with various embodiments described herein.

FIG. 5 illustrates a side view of the cutting device 120 in accordance with various embodiments described herein. The cutting device 120 can include the optical radiation source 122, the translation system 124, and the cut conveyor 126. In some embodiments, the cutting device 120 can include one or more imaging devices 162 and one or more environmental sensors 164. The imaging devices 162 are configured to image the sealing element 102 of the package 101 after the package passes the optical radiation source 122. The imaging devices 162 and environmental sensors 164 are communicatively coupled to the computing system 150. The elements of the cutting device 120 can be enclosed within a housing 121 in some embodiments.

In some embodiments, the environmental sensors 164 can include at least one of a smoke detection system, a temperature detector, a gas detection system, or a fire detection system. As optical radiation is applied to the sealing element 102 of the package 101, the sealing element is cut, damaged, ablated, removed, or pierced. In some instances, the process of cutting the sealing element 102 can create smoke or fire. This can occur under circumstances where the intensity of the optical radiation source 122 is too high, the focal point 123 is misaligned, and/or the package 101 is moving too slowly through the cutting device 120 leading to the deposition of too much energy in the sealing element 102. The environmental sensors 164 can measure environmental measurement data related to conditions within the cutting device 120 in some embodiments. For example, the environmental measurement data can be indicative of excessive smoke production or fire within the cutting device 120. In some embodiments, the computing system 150 can alert a user to dangerous conditions (e.g., fire, smoke, or gas emissions such as carbon monoxide or carbon dioxide) based upon an analysis of the environmental measurement data. In some embodiments, the computing system 150 can activate safety measures (e.g., power cut-off or fire suppression systems) based upon an analysis of the environmental measurement data.

The imaging devices 162 can image the sealing element 102 of the package 101 after the application of optical radiation to determine the cut quality (e.g., a measure of whether the cut was successful). Images can be transmitted from the imaging devices 162 to the computing system 150 for processing. In some embodiments, the success of the cut can be measured by analyzing the image of the package 101 to determine a cut success ratio. In some embodiments, the cutting device 120 applies a discrete number of physically separated cuts to the sealing element 102. The cut success ratio is defined as the proportion of successful cuts (e.g., cuts that fully punctured or pierced the sealing element 102) to total attempted cuts. In some embodiments, cut quality can be measured by analyzing the image of the package 101 to determine a surface area of the package 101 that is singed or discolored. Singeing of the sealing element 102 can indicate the need for adjustments in the optical radiation source 122 (e.g., intensity or focus adjustments) or can indicate that the package is moving too slowly through the cutting device 120. In some embodiments, the computing system 150 can store the assessed cut quality for a package 101 in the memory 151 of the computing system 150 as a historical cut quality. In some embodiments, the cut quality can be determined by the system by measuring the upper and lower bounds of a package and referencing the actual cut in the acquired image to determine the distance off from a centerline 106 of the sealing element 102. In some embodiments, the image of the cut sealing element 102 can be compared to an image of an "ideal" cut pattern to determine inconsistencies between the actual cut and a successful cut. In some embodiments, the imaging devices 162 can be located before and after the focal point 123 of the system at which the sealing element 102 is cut. The imaging devices 162 can acquire a reflectivity value for the sealing element 102 before the cut occurs and a reflectivity value for the sealing element 102 after the cut occurs. In the case of a successful cut, the reflectivity value of the sealing element 102 will be different from before to after the cut.

A speed of the cut conveyor 126 can be varied in some embodiments. In some embodiments, the variable-speed cut conveyor 126 can include a variable-speed drive or a servo motor. In some embodiments, the computing system 150 can adjust the speed of the cut conveyor 126 based upon height data from the height dimensioner 136, historical cut quality retrieved from the memory 151, and/or environmental measurement data received from the environmental sensors 164. For example, the computing system 150 can compare the cut success ratio to a pre-determined value for cut success ratio. Upon determining that the cut success ratio is below the pre-determined value, the computing system 150 can decrease the speed of the variable-speed cut conveyor 126 in some embodiments. In similar embodiments, the computing system 150 can increase the speed of the variable-speed cut conveyor 126 upon determining that the cut success ratio is above the pre-determined value. In some embodiments, the cut success ratio can be about 50%, 60%, 70%, 80%, 90%, 95%, or 99% as appropriate for a given application. In other words, the computing system 150 can adjust the speed of the cut conveyor 126 to slow the conveyor down to allow more time for the system to make cuts before the package passes out of the cutting device 120 when the historical cut quality is low. Conversely, the computing system 150 can speed up the cut conveyor 126 in some embodiments if cuts are uniformly of high quality (i.e., the historical cut quality is high). Likewise, the computing system 150 can speed up the cut conveyor 126 for subsequent packages if packages are burning based upon measurements of smoke or fire received from the environmental sensors 164 (i.e., if packages are spending too much time under the optical radiation source and are catching fire). Similarly, the computing system 150 can slow down or stop the cut conveyor 126 upon detection of fire or smoke, disable the optical radiation source, and activate fire suppression systems.

As mentioned, the computing system 150 can adjust the speed of the cut conveyor 126 based upon height data related to the vertical dimension 103 of the package 101. For example, the height data can be received from the height dimensioner 136. If the vertical dimension 103 of the package is such that the translation system 124 will not have to adjust the position of the focal point 123 over a large distance, the cut conveyor 126 can be sped up to bring the package 101 past the optical radiation source 122 more quickly. Because there is no need to leave time for adjustment when the focal point 123 is already in the correct position, the throughput of packages can be raised. For example, the computing system 150 can determine a difference between the vertical dimension 103 of the package 101 and a vertical position of the focal point 123. Upon determining that the difference is below a threshold value, the computing system 150 can increase the speed of the cut conveyor 126 to convey packages to or past the optical radiation source 122 more rapidly. This effect is multiplied when there are many packages of the same size and shape approaching the cutting device 120. If a series of packages all have the same dimensions, the translation system 124 will have to move the optical radiation source 122 very little between packages and the overall throughput of the cutting system 100 can be increased by increasing the speed of the cut conveyor 126. Similarly, the gap 108 between packages can be reduced to allow faster conveyance of packages through the cutting device 120. In some embodiments, the computing system 150 can receive package dimension information from the photodetectors 135 or an imaging device 162 of the in-feed conveyor system 130 to predict or forecast adjustments to the speed of the cut conveyor 126 in advance of the package 101 arriving at the cutting device 120. In some embodiments, the cutting device 120 can include four photodetectors 135 wherein two photodetectors 135 are located before the focal point 123 and two photodetectors 135 are located after the focal point 123.

In some embodiments, the computing system 150 can execute instructions to adjust an intensity of the optical radiation source 122 based on the historical cut quality or the environmental measurement data. For example, environmental measurement data indicating that a fire or smoke is present within the housing 121 of the cutting device 120 may mean that the intensity is too high. The computing system 150 can reduce the intensity of the optical radiation source 122 to reduce the likelihood of burning the package 101. Reducing the intensity can include lowering the intensity emitted from the optical radiation source 122 (e.g., turning down current or voltage in a laser source) or altering the intensity of the beam of optical radiation itself (e.g., using adjustable filters such as neutral density filters).

Figure 6C:
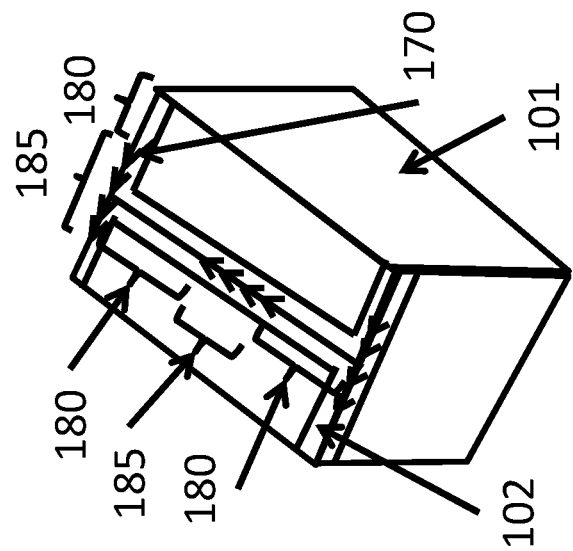
FIG. 6C illustrates the cut pattern formed over only a portion of the sealing element of the package in accordance with some embodiments described herein.
Figure 6B:
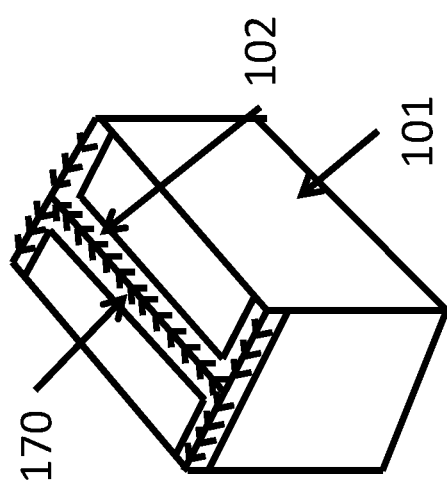
FIG. 6B illustrates the cut pattern formed over substantially the entire sealing element of the package in accordance with some embodiments described herein.
Figure 6A:
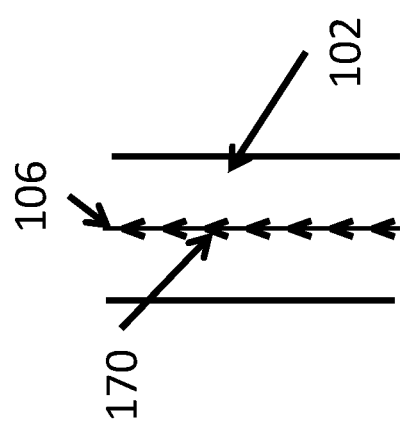
FIG. 6A illustrates a cut pattern formed on a sealing element of a package in some embodiments of the present disclosure.

FIG. 6A illustrates a cut pattern 170 formed on the sealing element of the package in some embodiments of the present disclosure. In the illustrated embodiment, the cut pattern 170 includes chevron-shaped cuts. The cut pattern 170 is oriented over a centerline 106 that represents the location where two flaps or sides of the top of the package come together and are sealed using the sealing element 102. In some embodiments, the sealing element 102 is tape or glue.

FIG. 6B illustrates the cut pattern 170 formed over substantially the entire sealing element 102 of the package 101 in accordance with some embodiments described herein. By extending the cut pattern 170 over substantially the entire sealing element 102, the system 100 can ensure that the sealing element 102 has been fully cut or damaged so that the box can be readily opened by a user. However, application of the cut pattern 170 to substantially all of the sealing element 102 also introduces disadvantages including increasing the wear and decreasing lifetime for the optical radiation source 122, introducing a greater quantity of particulates into the environment inside the housing 121 which can necessitate more frequent replacement of air filters in the cutting device 120, and slower processing of packages as greater care is used to cut the entire sealing element 102. In particular, the cutting device 120 may slow down in some embodiments while the optical radiation source 122 is active and speed up at other times to more quickly process packages. When using the cutting device 120 to cut substantially the entire sealing element 102, the total cut time may be longer as the package travels at a slower rate for a longer time.

FIG. 6C illustrates a cut pattern formed over only portion 185 of the sealing element 102 of the package 101 in accordance with some embodiments described herein. By applying the cut pattern 170 to only portions 185 of the sealing element 102, one or more uncut regions 180 of the sealing element 102 remain. By reducing the total area of the sealing element 102 that receives the cut pattern 170, the lifetime of the optical radiation source 122 and/or air filters in the housing 121 can be extended. The package may still be opened easily even though the amount of the sealing element that is vaporized is reduced. In addition, ongoing maintenance costs can be reduced and the speed of conveyor lines can be increased. In some embodiments, the portion 185 of the sealing element 102 along the centerline 106 having the cut pattern can have a linear dimension in a range from 5 cm to 25 cm. In some embodiments, the portion 185 of the sealing element 102 along the centerline 106 having the cut pattern can be a percentage of the total length of the sealing element along the centerline 106. For example, the portion 185 can represent between 25% and 75% of the total length. The portion 185 can represent about 50% of the total length in some embodiments. In some embodiments, the uncut portions 180 together can represent between about 0% and about 50% of the total length of the sealing element 102 along the centerline 106. In some embodiments, the portion 185 of the sealing element 102 along the centerline 106 having the cut pattern can be disposed at a distance from a leading edge or a trailing edge of package 101. The portion 185 can be offset from an end of the centerline 106 of the sealing element 102 by about 25% of the total length of the sealing element 102.

FIGS. 7A-7E illustrate different cut patterns that are applied using systems and methods described herein. In some embodiments, the cut pattern 171 can include chevrons that are oriented at 90 degrees with respect to the centerline 106 or with respect to the direction of travel 105 of the package 101 through the cutting device 120 as shown in FIG. 7A. In some embodiments, the cut pattern 172 can include a zig-zag shape as shown in FIG. 7B. Note that the cut pattern 172 includes connected cuts rather than discrete and disconnected cuts. Cut patterns in accordance with various aspects of this disclosure can include connected or disconnected cut forms. In some embodiments, the cut pattern 173 can include curlicues as shown in FIG. 7C. In some embodiments, the cut pattern 174 can include X-shaped cuts as shown in FIG. 7D. In some embodiments, the cut pattern 175 can include cross-cuts that run perpendicular or substantially perpendicular to the centerline 106 or the direction of motion 105 of the package 101 as shown in FIG. 7E. In other embodiments, the angle between the centerline 106 and the cross-cuts of the cut pattern 175 can be any angle in a range from 5° to 90°. Choice of cut pattern can be based on factors such as toughness of the material in the sealing element 102 or package 101, desired throughput of the device, and other factors. In some embodiments, the choice of cut pattern 175 can be made based upon the type of sealing element 102 (i.e., tape or glue), type of material for the package 101 (e.g., cardboard or plastic), type of package 101 (e.g., box or bag), the desire to limit or control exposure of the internal contents of the package 101 to the optical radiation source 122, the desire to extend the lifetime of the optical radiation source. In some embodiments, the computing device 150 can control the optical radiation source to change the cut pattern 175 used upon detection of poor cut quality or other conditions. For example, the computing device 150 can change to a cut pattern 175 that reduces the duty cycle of the optical radiation source 122 (i.e., the amount of time during the cut that the optical radiation source 122 is actively cutting) based upon detection of environmental factors such as smoke as described above.

Figure 8:
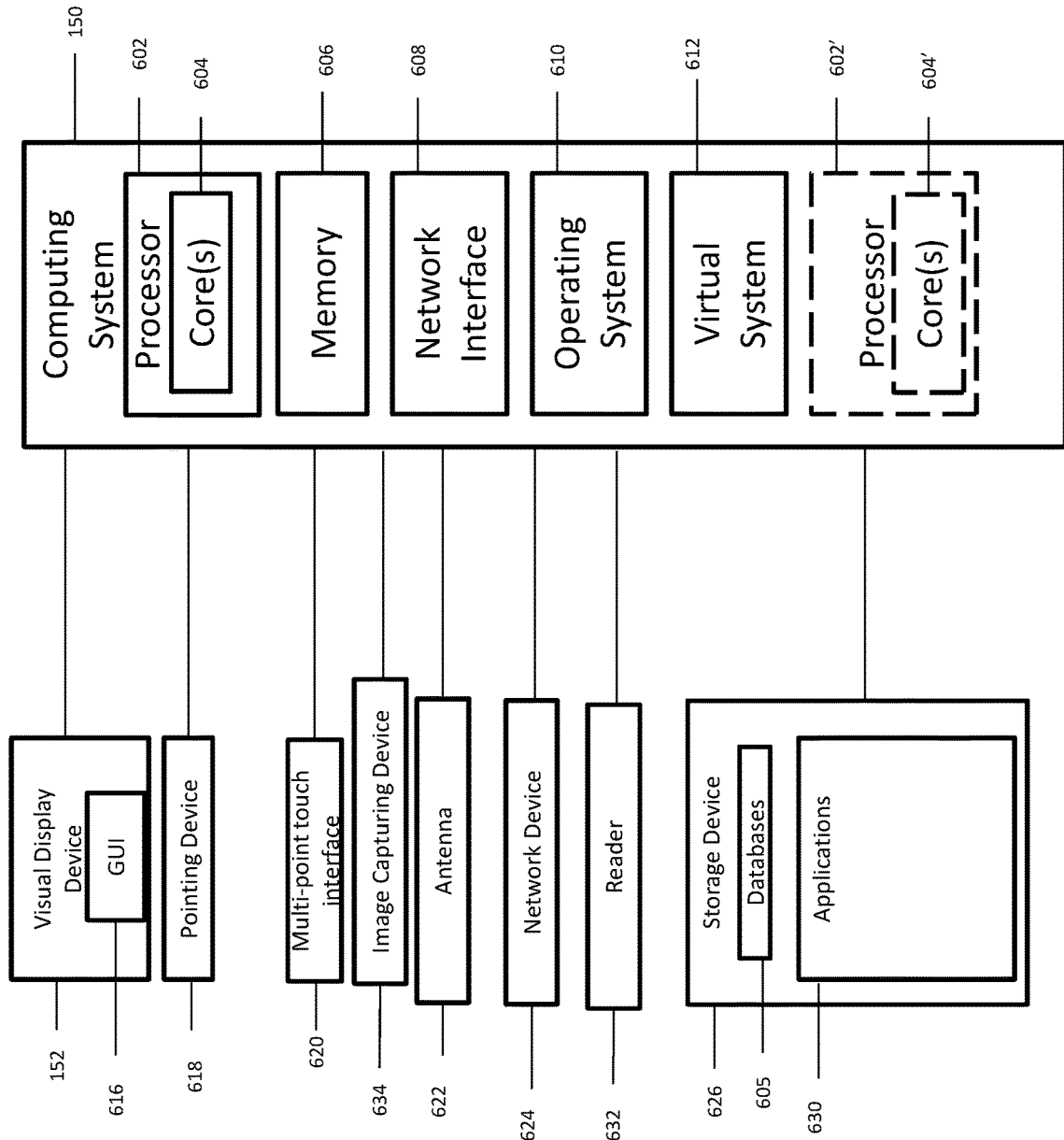
FIG. 8 is a block diagram of an example computing system for implementing exemplary embodiments of the present disclosure.

FIG. 8 is a block diagram of an example computing system for implementing exemplary embodiments of the present disclosure. The computing system 150 may be, but is not limited to, a smartphone, laptop, tablet, desktop computer, server, or network appliance. In various embodiments, the computing system 150 can be integrated into a single unit or can include distributed components that are connected by a network. For example, the computing system 150 can include a processor provided as part of the cutting device 120 and a separate processor or processors provided as part of the in-feed conveyor system 130. The computing system 150 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 606 included in the computing system 150 may store computer-readable and computer-executable instructions or software (e.g., applications 630) for implementing exemplary operations of the computing system 150. The computing system 150 also includes configurable and/or programmable processor 602 and associated core(s) 604, and optionally, one or more additional configurable and/or programmable processor(s) 602' and associated core(s) 604' (for example, in the case of computer systems having multiple processors/cores), for executing computer-readable and computer-executable instructions or software stored in the memory 606 and other programs for implementing exemplary embodiments of the present disclosure. Processor 602 and processor(s) 602' may each be a single core processor or multiple core (604 and 604') processor. Either or both of processor 602 and processor(s) 602' may be configured to execute one or more of the instructions described in connection with computing system 150.

Virtualization may be employed in the computing system 150 so that infrastructure and resources in the computing system 150 may be shared dynamically. A virtual machine 612 may be provided to handle a process running on multiple processors so that the process appears to be using only one computing resource rather than multiple computing resources. Multiple virtual machines may also be used with one processor.

Memory 606 may include a computer system memory or random access memory, such as DRAM, SRAM, EDO RAM, and the like. Memory 606 may include other types of memory as well, or combinations thereof.

A user may interact with the computing system 150 through a visual display device 152, such as a computer monitor, which may display one or more graphical user interfaces 616. The user may interact with the computing system 150 using a multi-point touch interface 620, a pointing device 618, an image capturing device 634, or a reader 632.

The computing system 150 may also include one or more computer storage devices 626, such as a hard-drive, CD-ROM, or other computer readable media, for storing data and computer-readable instructions and/or software that implement exemplary embodiments of the present disclosure (e.g., applications). For example, exemplary storage device 626 can include one or more databases 605 for storing cut quality information or physical parameters related to elements of the system. The databases 605 may be updated manually or automatically at any suitable time to add, delete, and/or update one or more data items in the databases.

The computing system 150 can include a network interface 608 configured to interface via one or more network devices 624 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 622 to facilitate wireless communication (e.g., via the network interface) between the computing system 150 and a network and/or between the computing system 150 and other computing systems. The network interface 608 may include a built-in network adapter, network interface card, PCMCIA network card, card bus network adapter, wireless network adapter, USB network adapter, modem or any other device suitable for interfacing the computing system 150 to any type of network capable of communication and performing the operations described herein.

The computing system 150 may run any operating system 610, such as versions of the Microsoft® Windows® operating systems, different releases of the Unix® and Linux® operating systems, versions of the MacOS® for Macintosh computers, embedded operating systems, real-time operating systems, open source operating systems, proprietary operating systems, or any other operating system capable of running on the computing system 150 and performing the operations described herein. In exemplary embodiments, the operating system 610 may be run in native mode or emulated mode. In an exemplary embodiment, the operating system 610 may be run on one or more cloud machine instances.

Figure 9:
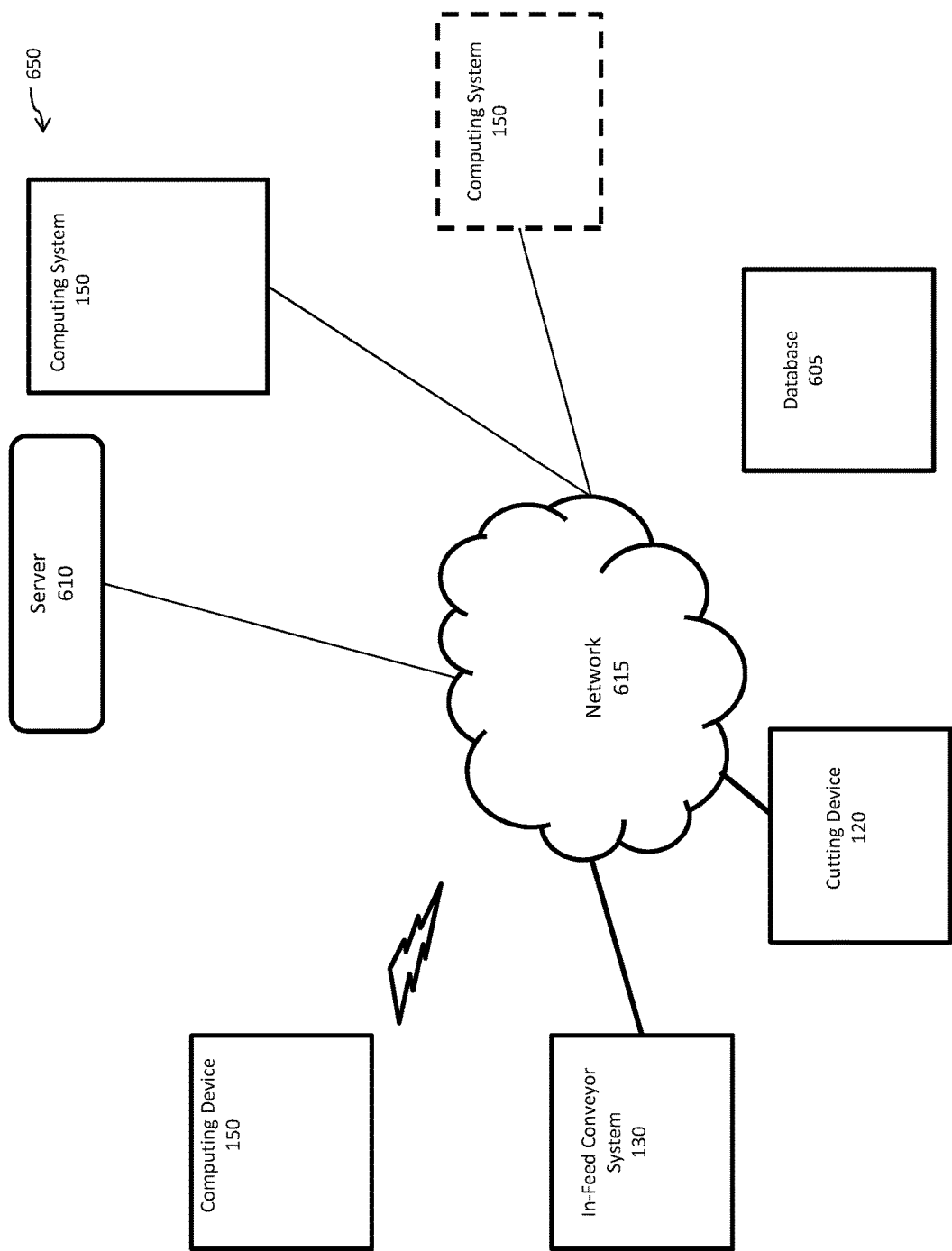
FIG. 9 illustrates a block diagram of an exemplary distributed computing environment in accordance with exemplary embodiments of the present disclosure.

FIG. 9 illustrates a block diagram of an exemplary distributed computing environment 550 in accordance with exemplary embodiments of the present disclosure. The environment 550 can include computing systems 150 configured to be in communication with the cutting device 120 or the in-feed conveyor system 130 via a communication network 615, which can be any network over which information can be transmitted between devices communicatively coupled to the network. For example, the communication network 615 can be the Internet, Intranet, virtual private network (VPN), wide area network (WAN), local area network (LAN), and the like. In some embodiments, the communication network 615 can be part of a cloud environment. In some embodiments, one or more computing systems 150 in the distributed computing environment 550 can be mobile computing devices that are in communication with other computing systems 150, the in-feed conveyor system 130, or the cutting device 120 via the communication network 615. The environment 550 can include at least one repository or database 605, which can be in communication with the computing systems 150, the in-feed conveyor system 130, or the cutting device 120 via the communications network 615.

Figure 10:
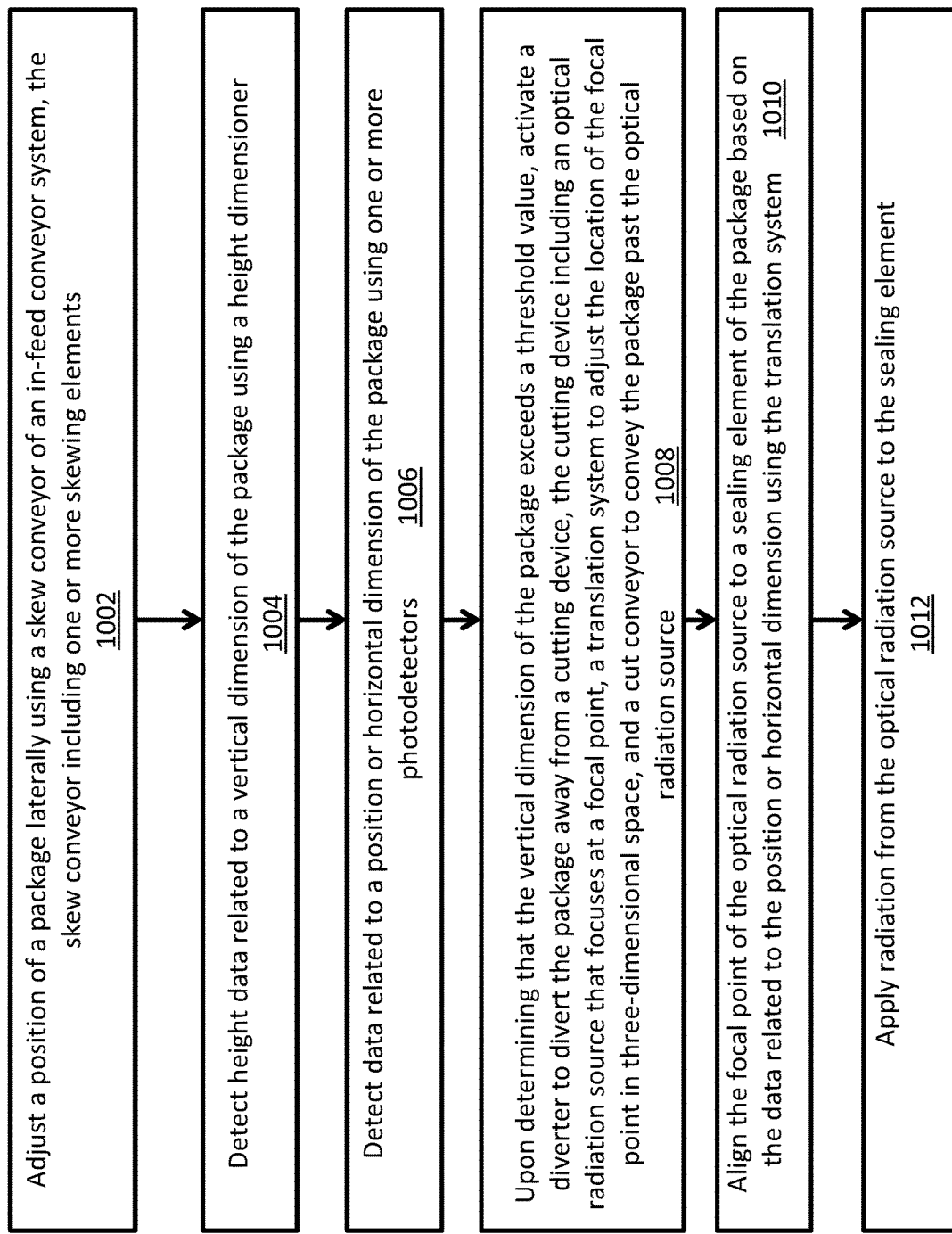
FIG. 10 illustrates a flowchart for a method for cutting in accordance with various embodiments described herein.

FIG. 10 illustrates a flowchart for a method 1000 for cutting in accordance with various embodiments described herein. The method 1000 includes adjusting a position of a package 101 laterally using a skew conveyor 132 of an in-feed conveyor system 130 (step 1002). The skew conveyor 132 includes one or more skewing elements 141. The method 1000 includes detecting height data related to a vertical dimension 103 of the package 101 using a height dimensioner 136 (step 1004).

The method 1000 includes detecting data related to a position or horizontal dimension 104 of the package 101 using one or more photodetectors 135 (step 1006). The method 1000 includes activating a diverter 137 to divert the package away from a cutting device 120 upon determining that the vertical dimension 103 of the package 101 exceeds a threshold value (step 1008). The cutting device 120 includes an optical radiation source 122 that focuses at a focal point 123, a translation system 124 to adjust the location of the focal point 123 in three-dimensional space, and a cut conveyor 126 to convey the package 101 past the optical radiation source 122.

The method 1000 includes aligning the focal point 123 of the optical radiation source 122 to a sealing element 102 of the package 101 based on the data related to the position or horizontal dimension 104 using the translation system 124 (step 1100). The method 1000 includes applying radiation from the optical radiation source 122 to the sealing element 102 (step 1012).

Figure 11:
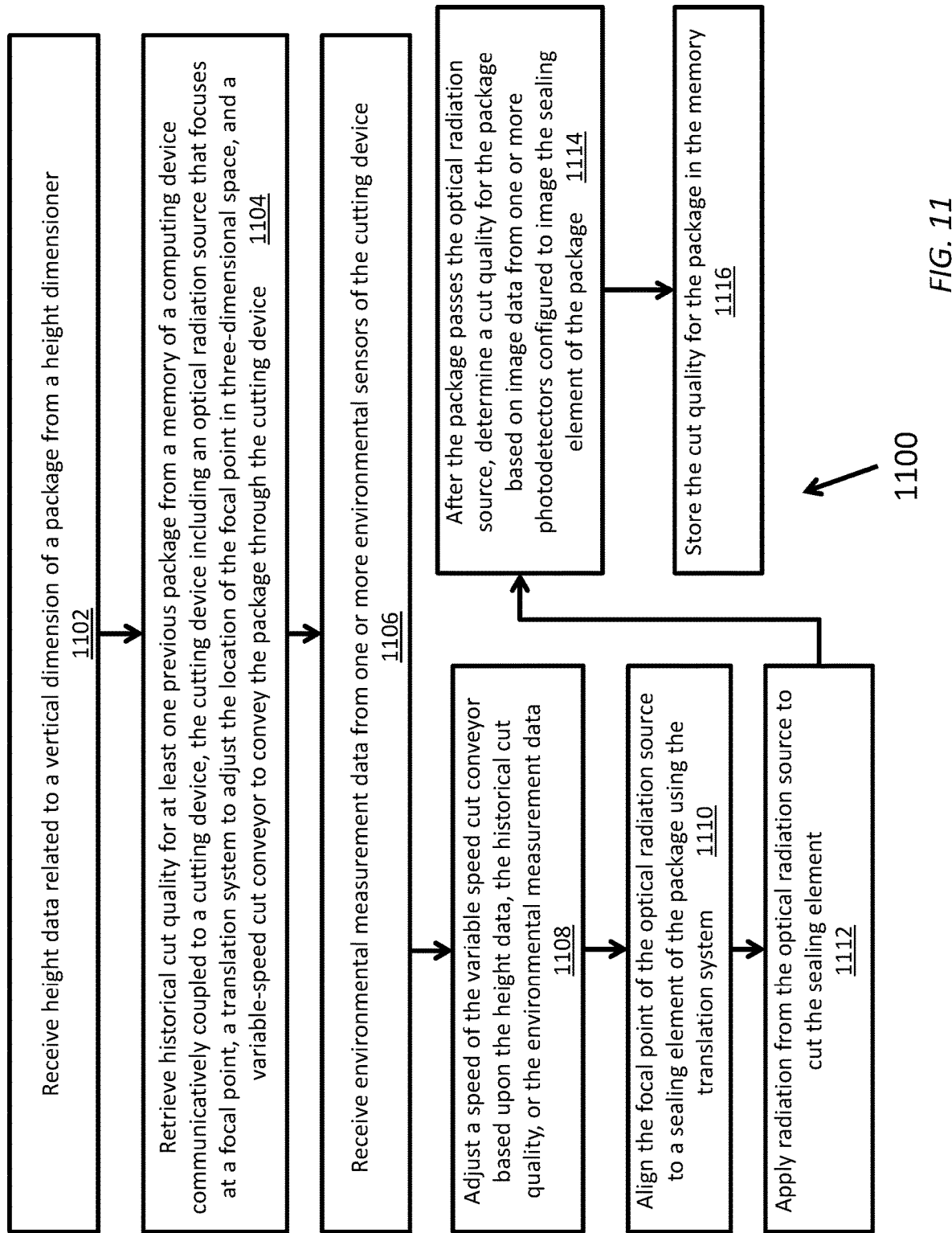
FIG. 11 illustrates a flowchart for a method for cutting in accordance with various embodiments described herein.

FIG. 11 illustrates a flowchart for a method 1100 for cutting in accordance with various embodiments described herein. The method 1100 includes receiving height data related to a vertical dimension 103 of a package 101 from a height dimensioner 136 (step 1102). The method 1100 includes retrieving historical cut quality for at least one previous package from a memory 151 of a computing system 150 communicatively coupled to a cutting device 120 (step 1104). The cutting device 120 includes an optical radiation source 122 that focuses at a focal point 123, a translation system 124 to adjust the location of the focal point 123 in three-dimensional space, and a variable-speed cut conveyor 126 to convey the package 101 through the cutting device 120.

The method 1100 includes receiving environmental measurement data from one or more environmental sensors 164 of the cutting device 120 (step 1106). The method 1100 includes adjusting a speed of the variable speed cut conveyor 126 based upon the height data, the historical cut quality, or the environmental measurement data (step 1108).

The method 1100 includes aligning the focal point 123 of the optical radiation source 122 to a sealing element 102 of the package 101 using the translation system 124 (step 1100). The method 1100 includes applying radiation from the optical radiation source 122 to cut the sealing element 102 (step 1112).

The method 1100 includes determining a cut quality for the package 101 based on image data from one or more imaging devices 162 configured to image the sealing element of the package after the package passes the optical radiation source (step 1114). The method 1100 includes storing the cut quality for the package in the memory (step 1116).

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A cutting system comprising:
   a cutting device, including:
   an optical radiation source that focuses at a focal point;
   a translation apparatus to adjust a location of the focal point in three-dimensional space; and
   a cutting device conveyor to convey a package past the optical radiation source;
   wherein the cutting device is controlled by a computing device;
   wherein the computing device is configured to execute instructions to align the focal point of the optical radiation source to a sealing element of the package based on data related to a position or dimension of the package using the translation apparatus and apply radiation from the optical radiation source to the sealing element.

2. The cutting system of claim 1, further comprising an in-feed conveyor arrangement to convey the package to the cutting device, the in-feed conveyor arrangement including:

a skew conveyor having one or more skewing elements to laterally adjust a position of the package in the in-feed conveyor arrangement;

one or more conveyor belts disposed between the skew conveyor and the cutting device, the one or more conveyor belts configured to convey packages in a direction of travel or counter to the direction of travel of the in-feed conveyor arrangement;

one or more photodetectors to detect data related to the position or a horizontal dimension of the package;

a height dimensioner to detect height data related to a vertical dimension of the package;

a diverter to divert the package away from the cutting device; and an entrance gate to prevent passage of the package when the vertical dimension of the package exceeds a threshold value.

3. The cutting system of claim 2, wherein the computing device including one or more processors communicatively coupled to the cutting device and the in-feed conveyor arrangement and configured to execute instructions to:

receive height data related to the vertical dimension of the package from the height dimensioner;

upon a determination that the vertical dimension of the package exceeds the threshold value, activate the diverter to divert the package;

receive data related to the position or horizontal dimension from the one or more photodetectors;

align the focal point of the optical radiation source to a sealing element of the package based on the data related to the position or horizontal dimension using the translation apparatus; and apply radiation from the optical radiation source to the sealing element.

4. The cutting system of claim 3, wherein the in-feed conveyor arrangement further comprises an accumulation conveyor coupled to the diverter to receive the diverted package.

5. The cutting system of claim 3, wherein the package is a first package and the computing device is further configured to execute instructions to:

receive data related to a position of a second package from the one or more photodetectors;

determine a gap between the first package and the second package based upon the data related to the position of the second package and the data related to the position of the first package; and upon determining that the gap is below a second threshold value, convey the first package or the second package using the one or more conveyor belts such that the gap is increased.

6. The cutting system of claim 3, wherein the diverter conveys the package at 90 degrees with respect to the direction of travel.

7. The cutting system of claim 3, wherein the skewing elements center the package with respect to the skew conveyor.

8. The cutting system of claim 3, wherein the skewing elements dispose the package along an outside edge of the skew conveyor.

9. The cutting system of claim 3, wherein the skewing elements form packages into a single-file line.

10. The cutting system of claim 3, wherein the skewing elements include skewed rollers or one or more angled protrusions that urge the package in a lateral direction as the package passes.

11. A method for cutting a sealing element on a container, the method comprising:

providing a cutting device, the cutting device including an optical radiation source that focuses at a focal point, a translation apparatus to adjust a location of the focal point in three-dimensional space, and a cutting device conveyor to convey a package past the optical radiation source;

aligning the focal point of the optical radiation source to a sealing element of the package based on data related to a position or a dimension of the package using the translation apparatus; and applying radiation from the optical radiation source to the sealing element.

12. The method of claim 11, further comprising:

providing an in-feed conveyor arrangement that provides the package to the cutting device, the in-feed conveyor arrangement comprising a skew conveyor, the skew conveyor including one or more skewing elements;

adjusting a position of the package laterally using the skew conveyor of the in-feed conveyor arrangement;

detecting height data related to a vertical dimension of the package using a height dimensioner;

detecting the data related to the position or a horizontal dimension of the package using one or more photodetectors;

upon determining that the vertical dimension of the package exceeds a threshold value, activating a diverter to divert the package away from the cutting device.

13. The method of claim 12, wherein activating the diverter diverts the package to an accumulation conveyor coupled to the diverter that receives the diverted package.

14. The method of claim 13, wherein the package is a first package and the method further comprises:

detecting data related to a position of a second package from the one or more photodetectors;

determining a gap between the first package and the second package based upon the data related to the position of the second package and the data related to the position of the first package; and upon determining that the gap is below a second threshold value, conveying the first package or the second package using one or more conveyor belts disposed between the skew conveyor and the cutting device such that the gap is increased, the one or more conveyor belts configured to convey packages in a direction of travel or counter to the direction of travel.

15. The method of claim 13, wherein diverting the package includes conveying the package at 90 degrees with respect to a direction of travel of the package.

16. The method of claim 13, wherein adjusting the position of the package laterally includes using the skewing elements to center the package with respect to the in-feed conveyor arrangement.

17. The method of claim 13, wherein adjusting the position of the package laterally includes using the skewing elements to dispose the package along an outside edge of the in-feed conveyor arrangement.

18. The method of claim 13, further comprising forming packages into a single-file line using the skewing elements.

19. The method of claim 13, wherein the skewing elements include skewed rollers or one or more angled protrusions that urge the package in a direction as the package passes.

* * * * *